(No Model.) 2 Sheets—Sheet 2.

W. R. HUSTON.
DEAD PULLEY.

No. 250,363. Patented Dec. 6, 1881.

Witnesses
Charles F. Hammond
John D. Parts

Inventor
William R. Huston

United States Patent Office.

WILLIAM R. HUSTON, OF LANSING, MICHIGAN.

DEAD-PULLEY.

SPECIFICATION forming part of Letters Patent No. 250,363, dated December 6, 1881.

Application filed June 27, 1881. (No model.)

*To all whom it may concern:*

Be it known that I, WILLIAM R. HUSTON, of Lansing, in the county of Ingham and State of Michigan, have invented a new and useful Improvement in Dead-Pulleys; and I do hereby declare that the following is a full and exact description of the same, reference being made to the accompanying drawings, and to the letters of reference marked thereon.

The object I have in view is an improvement upon dead-pulleys, whereby I produce a pulley which, when the machine or counter-shaft is not in use, relieves the belt from motion, thereby doing away with the annoyance caused by belts being left continually running on loose pulleys while the machines are not in use, thereby saving the wear of the belt and pulley, also the waste of oil and power, also doing away with the annoyance of noise.

Figure 1:
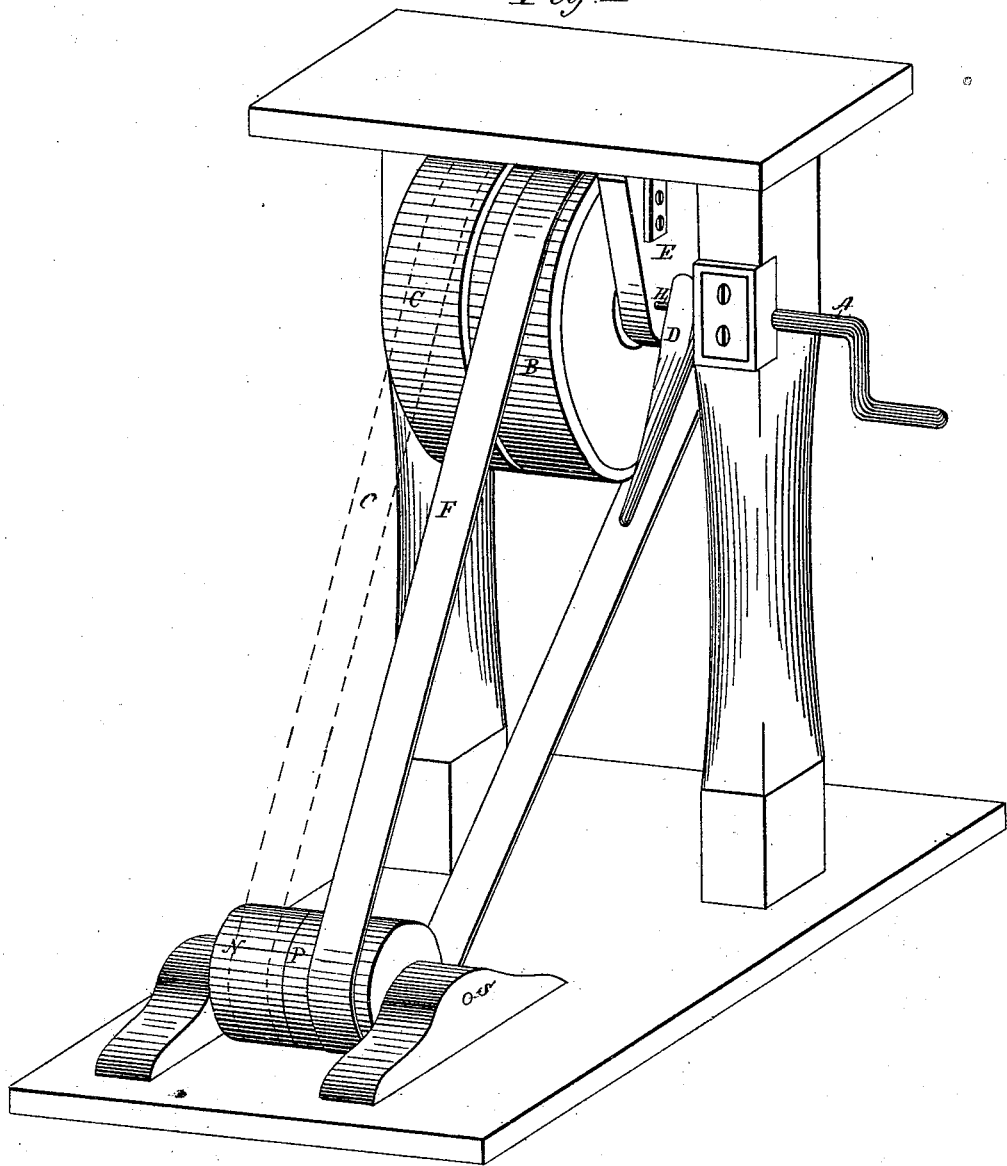
Figure 2:
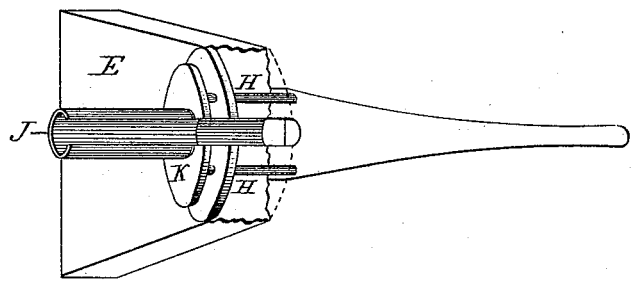

Figure 1 is a perspective view of pulleys, shaft, &c., from a rear view. Fig. 2 is a sectional view, also Fig. 3.

To enable others skilled in the art of manufacture and use of machinery, I proceed to describe the same, having reference to drawings.

A is line-shaft, as in Figs. 1 and 2; C, drive-pulley; B, dead-pulley; N, tight pulley; P, loose pulley; O, belt on tight and drive pulley; F, belt on dead-pulley and loose pulley.

J in Fig. 2 represents a hollow hub, on which pulley B rests and revolves.

Figure 3:
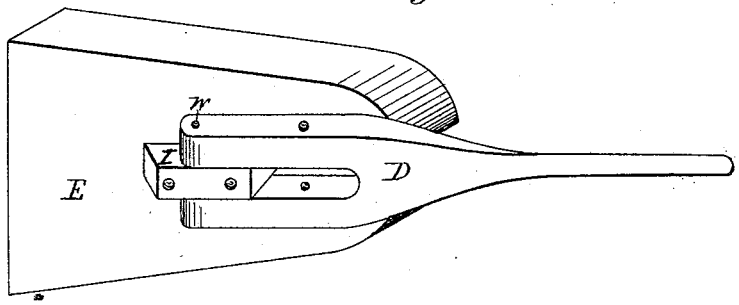

K in Fig. 2 represents a ring or washer encircling hollow hub J and connected with lever D by arms H H, as in Figs. 1, 2, and 3.

E represents a rest, of wood or iron, to which hub J is bolted, as in Fig. 2; E, rest, of wood or iron, to be securely fastened to floor, ceiling, or frame-work over line-shaft A, as in Fig. 1.

W and I represent a pin and block, holding upper end of lever, as in Figs. 1 and 3.

To illustrate, we will suppose line-shaft A and drive-pulley C to be revolving at usual speed. As belt F stands on dead-pulley B and loose pulley P, belt F stands still. To shift belt F over to take the place of dotted lines, (marked O,) we bear to the left on lever D, as represented in Fig. 1. Bearing lever D bears ring or washer K against dead-pulley B, causing dead-pulley to move over on hollow hub J against drive-pulley C, which is in motion, causing friction between pulleys C and B, causing pulley B to revolve with pulley C, by which means belt F shifts over easily and takes the place of the dotted lines of belt represented by letter O in Fig. 1. To shift belt back again from drive-pulley C and N to dead-pulley B and loose-pulley P, use the lever D the same as in shifting the belt the other way.

Having thus fully described my pulley and attachments, what I claim as new therein, and desire to secure by Letters Patent, is—

1. In combination with the dead-pulley, the hollow hub J, upon which dead-pulley stands and revolves, substantially as and for the purposes set forth.

2. In combination with the dead-pulley, the ring or washer K, encircling hollow hub, substantially as and for the purposes set forth.

3. In the dead-pulley, the combination, with the connecting-arms H, connecting ring or washer K, and lever D, substantially as and for the purposes set forth.

4. In combination with the dead pulley, lever D, substantially as and for the purposes set forth.

5. In combination with the dead-pulley, the support or rest E, substantially as described and shown.

This specification signed and witnessed this 8th day of July, 1881.

WILLIAM R. HUSTON.

In presence of—
CHARLES F. HAMMOND,
JOHN Q. PARK.